United States Patent [19]
Takata et al.

[11] Patent Number: 5,495,433
[45] Date of Patent: Feb. 27, 1996

[54] DATA PROCESSING CIRCUIT

[75] Inventors: Yukari Takata; Yukihiko Shimazu, both of Itami, Japan

[73] Assignee: Mitsubishi Denki Kabushiki Kaisha, Tokyo, Japan

[21] Appl. No.: 353,163

[22] Filed: Dec. 9, 1994

Related U.S. Application Data

[63] Continuation of Ser. No. 160,756, Dec. 3, 1993, abandoned.

[30] Foreign Application Priority Data

Jan. 29, 1993 [JP] Japan ................................... 5-013110

[51] Int. Cl.⁶ ........................................................ G06F 7/38
[52] U.S. Cl. ........................................................ 364/736
[58] Field of Search ..................................... 364/736, 749

[56] References Cited

U.S. PATENT DOCUMENTS

| | | | |
|---|---|---|---|
| 4,525,776 | 6/1985 | Eldumiati et al. | 364/736 |
| 4,740,894 | 4/1988 | Lyon | 364/736 |
| 4,881,168 | 11/1989 | Inagami et al. | 364/736 |
| 5,073,864 | 12/1991 | Methvin et al. | 364/715.11 |
| 5,153,846 | 10/1992 | Rao | 364/724.16 |
| 5,163,154 | 11/1992 | Bournas et al. | 364/736 |
| 5,177,701 | 1/1993 | Iwasa. | |

*Primary Examiner*—Tan V. Mai
*Attorney, Agent, or Firm*—Lowe, Price, LeBlanc & Becker

[57] ABSTRACT

A data processing circuit being provided with a select and output circuit 5 selectively outputting an operation result of an arithmetic logic unit (ALU)4 to a D bus 8, a temporary latch 2 holding a data part of a register 11 into which the operation result is written, and a select and output circuit 3 selectively outputting the data held in the temporary latch 2 to the D bus 8, wherein the select and output circuit 5 for the ALU 4 outputs only bits corresponding to a designated writing size to the D bus 8, the select and output circuit 3 for the temporary latch 2 outputs other than bits corresponding to the designated writing size to the D bus 8, and the register 11 inputs and stores data from the D bus 8, thereby leading to be capable of reducing the area of the register file 1.

10 Claims, 10 Drawing Sheets

DATA PROCESSING CIRCUIT

This application is a continuation of application Ser. No. 08/160,756, filed Dec. 3, 1993, now abandoned.

BACKGROUND OF THE INVENTION

1. Field of the Invention

The present invention relates to a data processing circuit, particularly to a data processing circuit including a register capable of rewriting only data of a portion of a designated size for writing, and an arithmetic and logic unit.

2. Description of the Related Art

Figure 1:
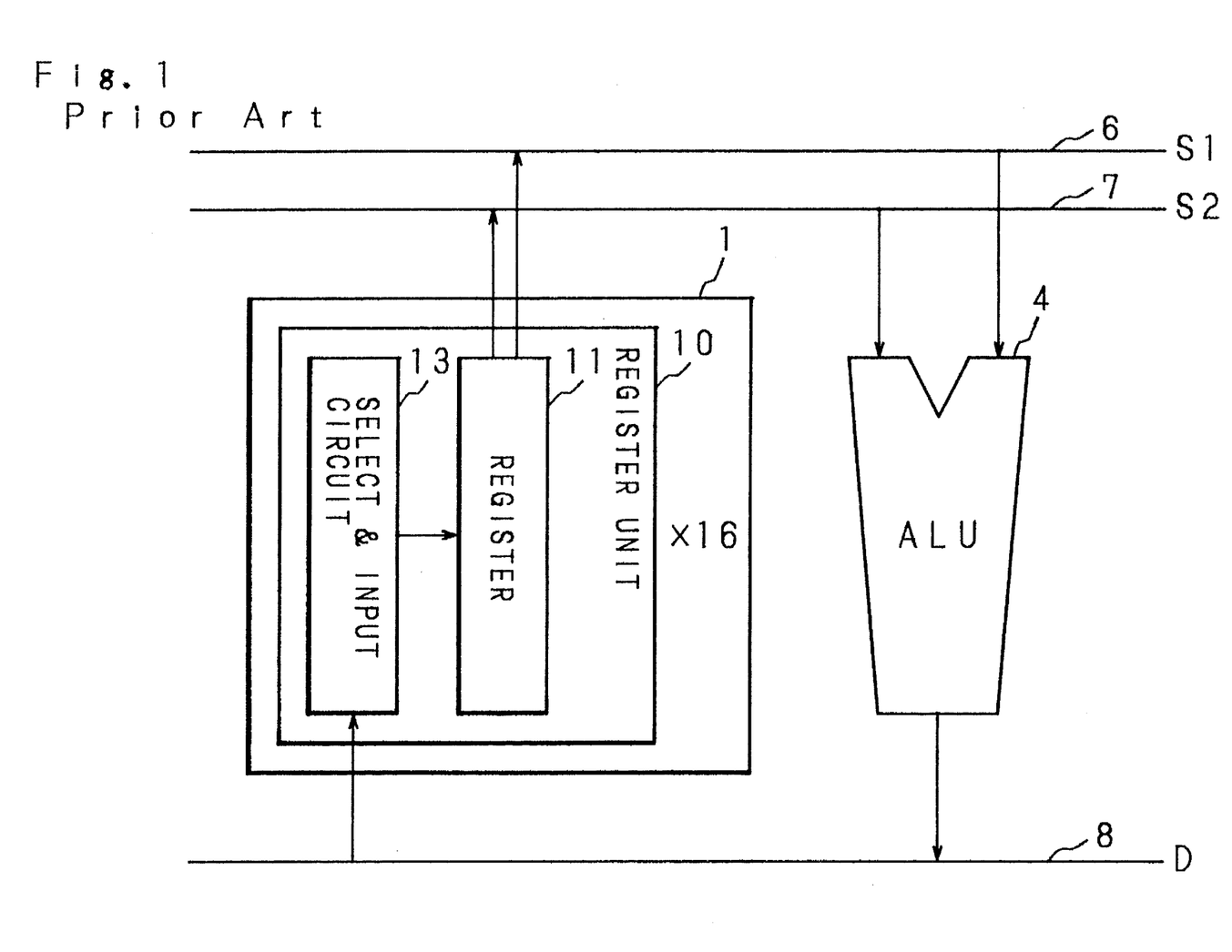
FIG. 1 is a block diagram showing a configuration example of a conventional data processing circuit.

FIG. 1 is a block diagram showing a configuration example of a conventional data processing circuit composed of an arithmetic and logic unit (ALU) 4 dealing with data of four bytes (one word) and a register file 1.

The ALU 4 performs operation of data respectively inputted from an S1 bus 6 and an S2 bus 7, and outputs the operation result to a D bus 8 in four bytes.

The register file 1 is composed of 16 registers 11 each of which is 32 bits (four bytes), and one of the register 11 is selected and the operation result by the ALU 4 is inputted thereto from the D bus 8 and stored.

And data is outputted from the respective registers 11 to the S1 bus 6 and S2 bus 7.

In this data processing circuit, it is possible to deal with three kinds of sizes of byte, half word, and word, and the respective data length are shown in the following;

byte: one byte (eight bit)

half word: two byte (16 bits )

word: four byte (32 bits)

Figure 2:
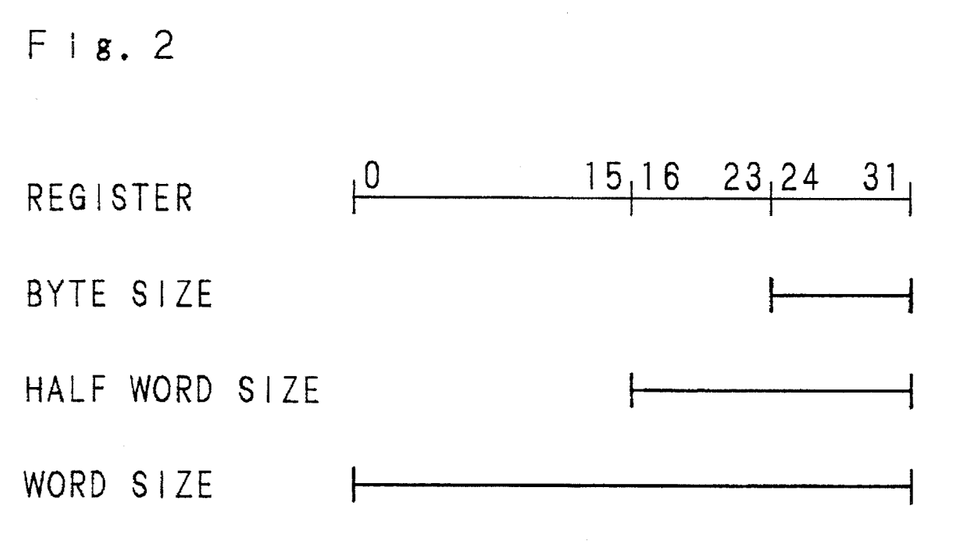
FIG. 2 is a schematic diagram showing bit positions which data of the respective sizes occupy in 32 bits of each register of the data processing circuits of the conventional and the present invention.

In each register 11, only data corresponding to a designated size is written and data other than that is to kept an original value, that is, a value before a new data is written FIG. 2 shows bit positions which data of the respective sizes occupy in 32 bits of each register 11.

A byte size data is effective in lower one byte (24:31) of the register 11, a half word size data is effective in lower two bytes (16:31) of the register 11, and a word size data is effective in all of the four bytes (0:31) of the register 11.

In order to control writing by the three kinds of size to each register 11, each conventional register 11 is provided with a select and input circuit 13. One register 11 is provided with one select and input circuit 13, and the two configures one register unit 10.

The select and input circuit 13 is controlled by a control signal to be described later, selects whether or not write data inputted from the D bus 8 and writes data only to a designated portion according to the writing sizes of the register 11.

Figure 3:
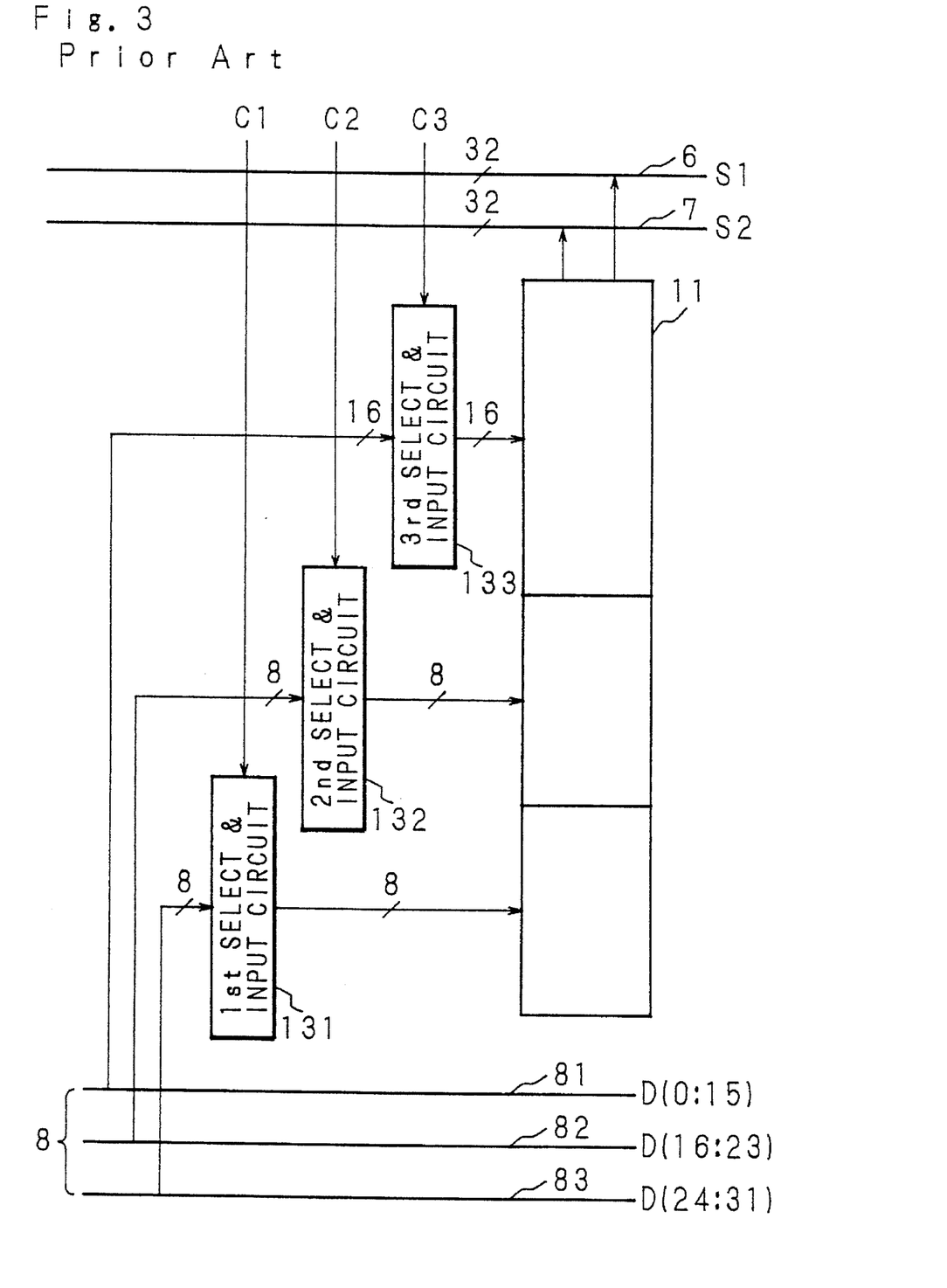
FIG. 3 is a block diagram showing a concrete configuration of each register unit of a conventional data processing circuit.

FIG. 3 is a concrete configuration of each register unit 10.

Three control signal are necessary to input three kinds of data.

That is, the first select and input circuit 131 for inputting lower one byte (24:31) to the register 11 is controlled by a control signal C1 to select whether or not write data from the D (24:31) 83 which is a portion of the D bus 8. The second select and input circuit 132 for inputting one byte (16:23) being upper than the D (24:31) 83 to the register 11 is controlled by a control signal C2 to select whether or not write data from the D (16:23) 82 which is a portion of the D bus 8. The third select and input circuit 133 for inputting the upper two bytes (0:15) to the register 11 is controlled by a control signal C3 to select whether or not write data from the D (0:15) 81 which is a portion of the D bus 8.

When word is designed as the writing size, all of the control signals C1, C2 and C3 become "1" and D (0:31), that is, all the data of the D bus 8 is written into the register 11.

When half word is designated as the writing size, the control signal C1 and C2 become "1" and D (16:31), that is, data of the D (16:23) 82 and the D (24:31) 83 is written into the lower two bytes of the register 11.

When byte is designated as the writing size, only the control signal C1 becomes "1" and the at a of the D (24:31) 83 is written into the lower one byte of the register 11.

By the way, since one select and input circuit 13 is necessary for each register unit 10 together with one register 11, as the number of the registers 11 increases, the number of the select and input circuits 13 increase, thereby the occupying area on a chip, increases and since the number of the control signals increase, the wiring area therefor also increases.

And in a processor having a super scalar function, the register has a plurality of input ports. In this case, since the input control signal necessary for one register is "3× the number of the input ports", when the number of the registers increase, the occupying area on the chip further increases.

In such a prior art as aforementioned, since one select and input circuit is provided for each one register, there has been a problem that an occupying area of the register file on a chip is increased. It becomes obvious particularly when there are many registers or a register has a plurality of input ports.

SUMMARY OF THE INVENTION

The present invention has been devised in consideration of such circumstance, and the object thereof is to provide a data processing circuit capable of decreasing the occupying area of the register file.

The data processing circuit related to the present invention is provided with a select and output circuit for selectively outputting an operation result done by an arithmetic and logic unit to a data bus, a latch for holding a part of data of a register in which the operation result is written, and a select and output circuit for selectively outputting data held in the latch to a data bus.

In the data processing circuit of the present invention, the select and output circuit of the arithmetic and logic unit outputs only its corresponding to the designated writing size to the data bus, the select and output circuit of the latch outputs bits other than bits corresponding to the designated writing size to the data bus, and the register inputs data from the bus to store it.

The above and further objects and features of the invention will more fully be apparent from the following detailed description with accompanying drawings.

DESCRIPTION OF THE PREFERRED EMBODIMENTS

In the following, explanation will be made in detail on the invention referring to the drawings showing the embodiments thereof.

Figure 4:
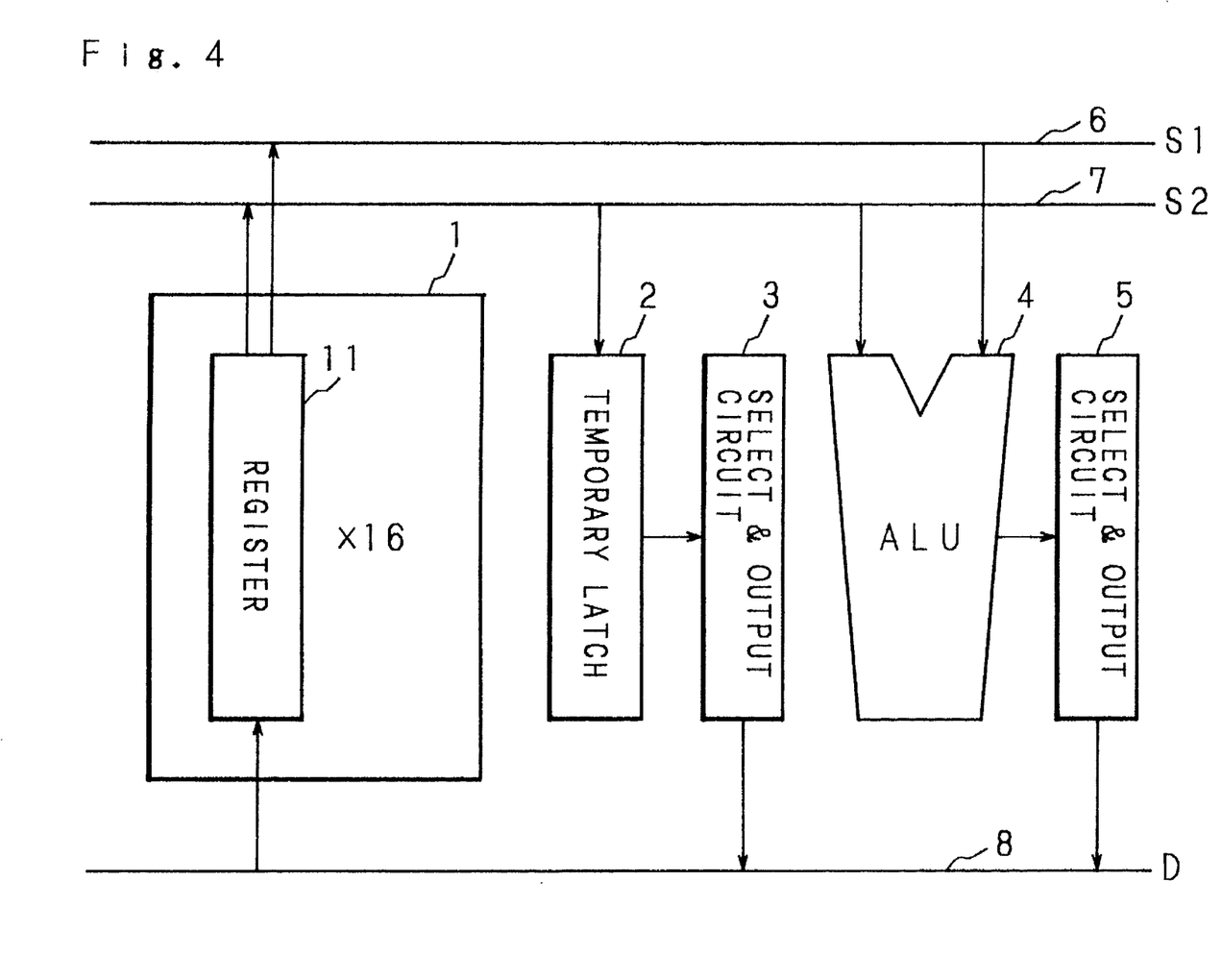
FIG. 4 is a block diagram showing a configuration example of a data processing circuit of the present invention.

FIG. 4 is a block diagram showing a configuration example of a data processing circuit of the invention.

In FIG. 4, reference numeral 1 designates a register file, and in this embodiment, it is composed of 16 registers 11 each of which having 32 bits, in the same way as in the conventional example.

In addition, different from the conventional example, a select and input circuits is not provided in the register file 1.

Numeral 2 designates a temporary latch and 3 designates a select and output circuit for the temporary latch, and they are described later.

Numeral 4 designates an arithmetic and logic unit (ALU), dealing data of four byte (one word). Numeral 5 designates a select and output circuit for the ALU 4.

Numerals 6, 7 and 8 designate an S1 bus, an S2 bus and a D bus respectively, and they are data buses of 32 bits respectively.

From the register file 1, source data is outputted to the S1 bus 6, and destination data is outputted to the S2 bus 7. And the only one, register 11 which has been designated to be written among the 16 registers 11 in the register file 16, data is inputted from the D bus 8.

The input/output data of the register file 1 is always 32 bits. The ALU 4 inputs data from the S1 bus 6 and S2 bus 7 to execute an operation. The operation result is selectively outputted to the D bus 8 by the select and output circuit 5.

The temporary latch 2 inputs and latches the upper three bytes of the data outputted to the S2 bus 7 from the register which has been designated to be written, and outputs data which has been lathed by itself to the D bus 8 selectively according to the control of the select and output circuit 3.

Since, explanation will be made on the later, the operation result of the ALU 4 is always inputted to the lower one byte even when the byte size as the minimum size is designated in the writing of data from the D bus 8 to the respective registers 11 in the register file 1, the temporary latch 2 is not necessary to latch the lower one byte.

In the same way as in the conventional example, data of three kinds, that is, byte size, half word size, and word size can be dealt with and the data lengths thereof are;

byte: one byte (eight bit)

half word: two bytes (16 bits)

word: four bytes (32 bits)

It is also same as in the conventional example that only data corresponding to a designated size is written in the respective registers 11, and the data other than that is to kept an original value, that is, a value before a new data is written.

The bit positions which data of the respective sizes occupy in the 32 bits of the respective registers 11 are also same as those of the conventional example shown in the aforementioned FIG. 2.

The data of byte size is effective in the lower one byte (24:31) of the register 11, the data of half word size in the lower two bytes (16:31) of the register 11, and the data of word size in all of the four bytes (0:31) of the register 11.

In the following, explanation will be made on the data processing circuit of the invention. [In case of two operand instruction]

The two operated instruction takes a form of

"source op destination→ destination".

This means that source data and destination data are operated (op) to be stored in a destination.

When this instruction is executed, the source data is inputted from the S1 bus 6 and the destination data from the S2 bus 7 to the ALU 4 respectively. And the operation result is written back to the destination register. In this case, the register which outputs the data (destination data) to the S2 bus is the register in which the operation result is written, and data of three bytes among data of four bytes (32 bits) outputted to the S2 bus 7 from that register is inputted to the temporary latch 2 from the S2 bus 7.

Figure 5:
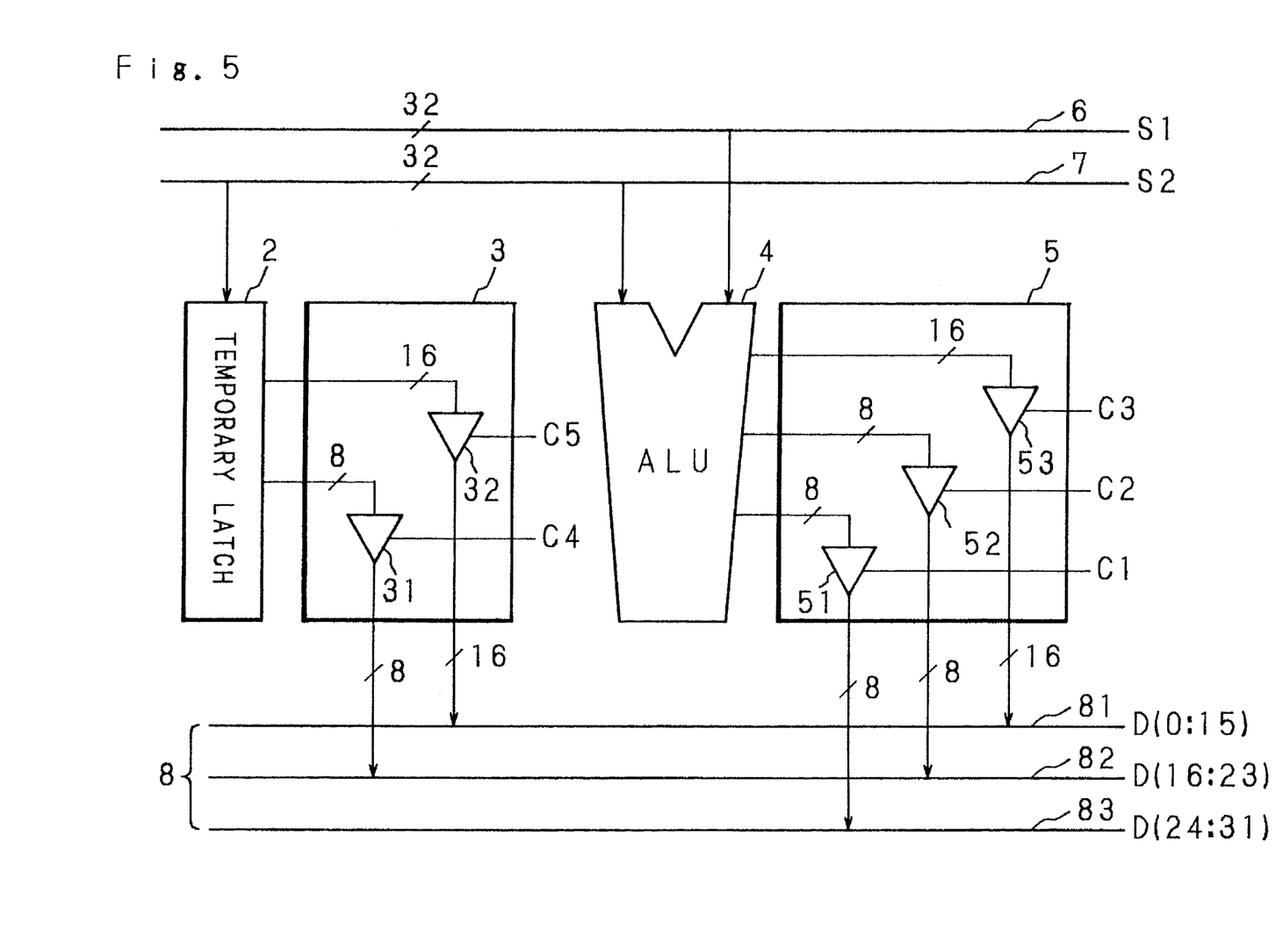
FIG. 5 is a block diagram showing a detailed configuration of a select and output circuit for a temporary latch and of a select and output circuit for an ALU.

In FIG. 5, detailed configuration of the select and output circuit 3 for the temporary latch 2 and of the select and output circuit 5 for the ALU 4 are shown.

The lower one byte (24:31) among the outputs of the operation result of 32 bits of the ALU 4 is connected to the D (24:31) 83 which is a part of the D bus 8 through a tri-state driver 51, the one byte (16:23) being upper than the lower one byte to the D (16:23) 82 which is a part of the D bus 8 through a tri-state driver 52, and the upper two bytes (0:15) to the D (24:31) 83 which is a part of the D bus 8 through a tri-state driver 53.

In addition, the tri-state driver 51 is controlled to output data to the D bus 8 or not by a control signal C1, the tri-state driver 52 by a control signal C2, and the tri-state driver 53 by a control signal C3.

The one byte (16:23) being upper than the lower side one byte (24:31) among the outputs of the temporary latch 2 is connected to the D (16:23) 82 which is a part of the D bus 8 through a tri-state driver 31, and the upper two bytes (0:15) to the D (0:15) 81 which is a part of the D bus 8 through the tri-state driver 32.

In addition, the tri-state driver 31 is controlled to output data to the D bus 8 or not by a control signal C4 and the tri-state driver 32 by a control signal C5.

Accordingly, when Word is designated as the writing size, since all of the control signals C1, C2 and C3 which are given to the respective tri-state drivers 51, 52 and 53 of the select and output circuit 5 of the ALU 4 becomes "1" and all of the tri-state drivers 51, 52 and 53 are on (opened), all of the outputs of 32 bits which is the operation result of the ALU 4 is outputted to the D bus 8. On the other hand, since both of the control signals C4 and C5 which are given to the respective tri-state driver 31 and 32 of the select and output circuit 3 of the temporary latch 2 become "0" and both of the tri-state drivers 31 and 32 are off (closed), the data which is held by the temporary latch 2 is not outputted at all.

When half word is designated as the writing size, since the control signals C1, C2 and C5 respectively given to the tri-state drivers 51, 52 of the select and output circuit 5 for the ALU and to the tri-state driver 32 of the select output circuit 3 for the temporary latch 2 become "1" and the tri-state drivers 51, 52 and 32 are on, the lower 16 bits (16:31) of the operation result by the ALU 4 are outputted to the D (16:31) of the D bus 8, that is, to D (16:23) 82 and the D (24:31) 83, and the upper 16 bits (0:15) of the temporary latch 2 are outputted to the D (0:15) 81 of the D bus 8.

When byte is designated as the writing size, since the control signals C1, C4 and C5 respectively given to the tri-state driver 51 of the select and output circuit 5 for the ALU 4 and to the tri-state drivers 31 and 32 of the select and output circuit 3 fort the temporary latch 2 become "1" and the tri-state drivers 51, 31 and 32 are on, the lower eight bits (24:31) of the operation result by the ALU 4 are outputted to the D (24:31) 83 of the D bus 8, and the upper 24 bits (0:23) of the temporary latch 2 are outputted to the D (0:23) of the D bus 8, that is, to the D (16:23) 82 and the D (10:15) 81.

Explanation will be made on the concrete operation of the data processing circuit of the invention referring to the timing chart.

Figure 6:
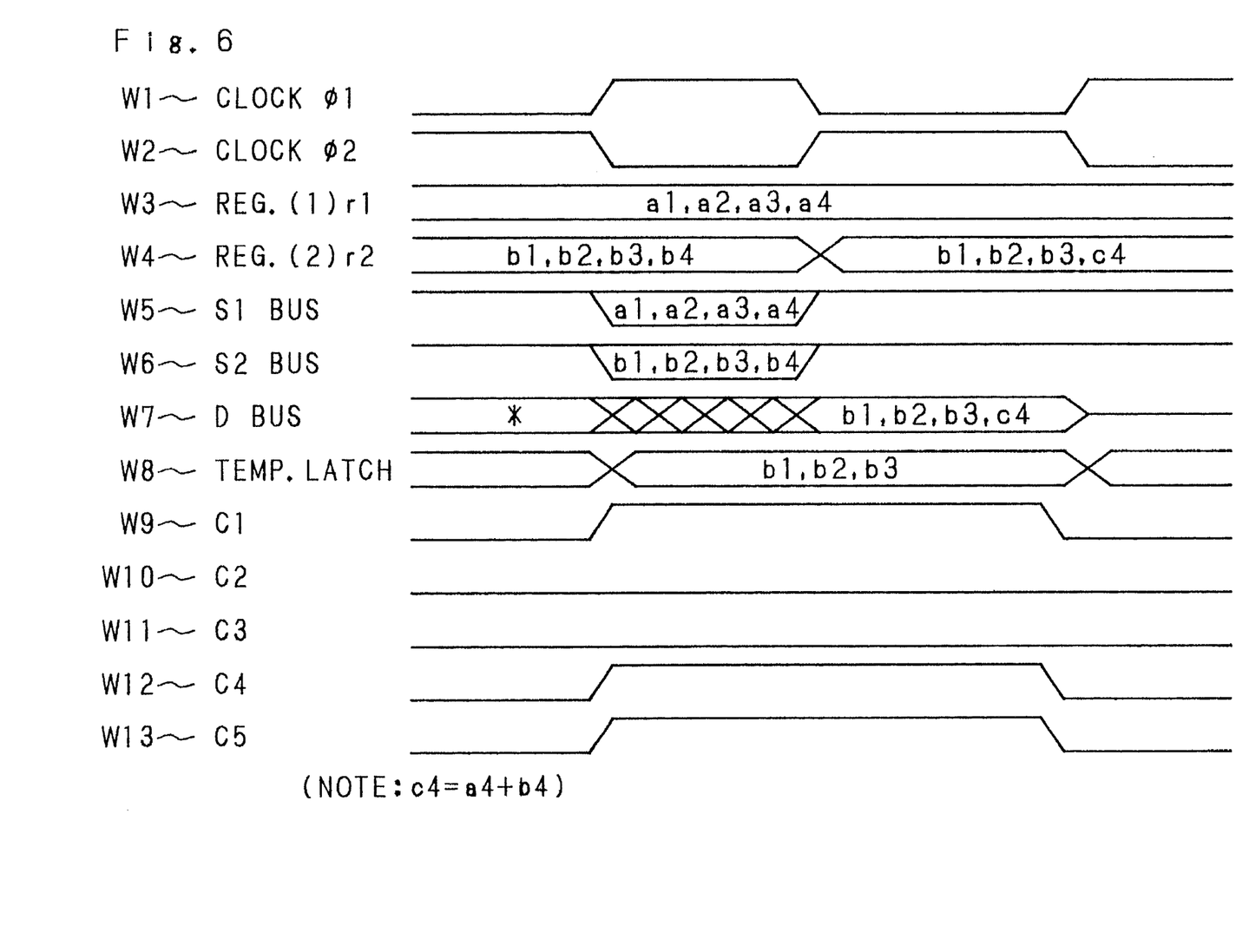
FIG. 6 is a timing chart for explaining an operation state of a data processing circuit of the invention.

In the timing chart in FIG. 6, there is shown a state of a case where processings for "r1. byte+r2. byte→r2. byte", that is, processings for "byte data of the register (1)+byte data of the register (2) are written in the register (2) by byte size" are executed, is shown.

In FIG. 6, ø1, ø2 which are designated respectively by reference symbols W1, W2 are non overlap two phase clocks.

And the data being stored in the register (1) is shown by r1={a1, a2, a3, a4} as shown in W3 in FIG. 6, and the data being stored in the register (2) is shown by r2={b1, b2, b3, b4} as shown in W4 in FIG. 6. Here, an, bn (n=1, 2, 3, 4) represents eight:bit data respectively.

At the rising of the clock ø1, as shown by W5 and W6 in FIG. 6 the data r1={a1, a2, a3, a4} of the register (1) is outputted to the S1 bus 67, and the data r2={b1, b2, b3, b4} of the register (2) is outputted to the S2 bus 7. In this case, from each of the two registers (1) and (2), all of the 32 bits are outputted.

The ALU 4 inputs data from the S1 bus 6 and the S2 bus 7 to execute operation.

The temporary latch 2 inputs data from the S2 bus 7. This temporary latch 2, as aforementioned, is a latch of three bytes, and as shown by W8 in FIG. 6, it inputs upper three bytes {b1, b2, b3} among data r2={b1, b2, b3, b4} of 32 bits outputted from the register (2) to the S2 bus 7. At this time, byte is designated as the writing size, as shown by W9, W10, W11, W12 and W13 in FIG. 6, the control signals C1, C4 and C5 become "1" and the control signals C2 and C3 becomes "0". As the result, to the D (0:15) 81 and the D (16:23) 82 of the D bus 8, that is, to the D (0:23), data of three bytes { b1, b2, b3} held in the temporary latch 2 is outputted, and to the D (24:31) 83, the lower one byte of the operation result by the ALU 4 is outputted. Accordingly, as shown by W7 in FIG. 6, the data of 32 bits on the D bus 8 becomes to be {b1, b2, b3, c4}.

Since the register file 1 inputs the data of the D bus 8 at the rising of the ø2 shown by W2 in FIG. 6 and writes it intact therein, after finishing of the instruction, the data of the register (2)becomes to be r2=(b1, b2, b3, c4}, and the fact means only the lower one byte has been rewritten.

Here, c4=a4+b4.

Figure 7:
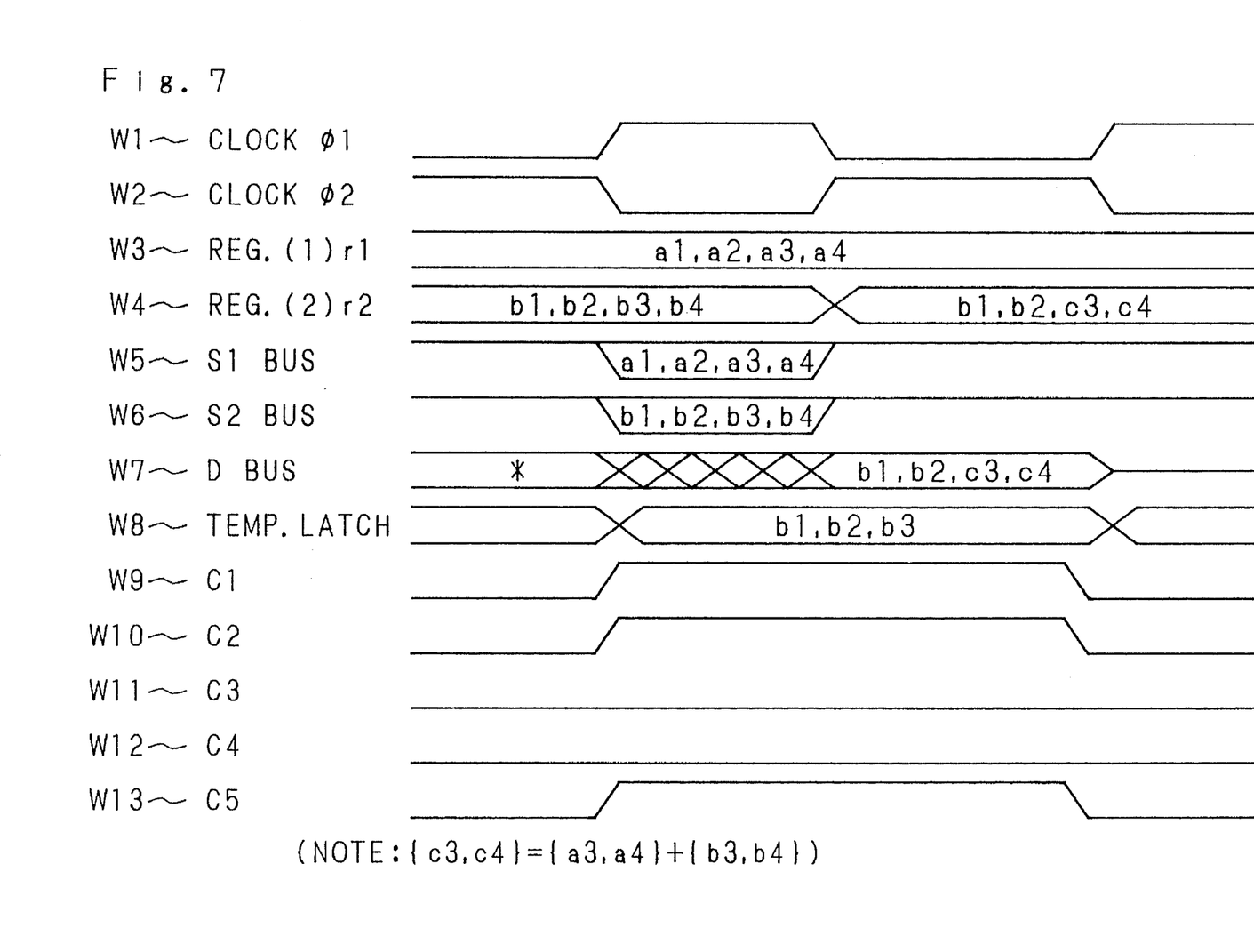
FIG. 7 is a timing chart for explaining an operation state of a data processing circuit of the invention.

In the timing chart in FIG. 7, a state of a case where processings for "r1. half word+r2. half word→r2. half word", that is, processings for "half word data of the register (1)+half word data of the register (2) are written in the register (2) by half word size" is executed, is shown.

At the rising of the clock ø1 shown by W1 in FIG. 7, as shown W5 and W6 in FIG. 7, the data r1=(a1, a2, a3, a4} of the register (1) is outputted to the S1 bus 6, and the data r2={b1, b2, b3, b4} of the register (2) is outputted to the S2 bus 7. In this case, from each of the registers (1), (2), all of the 32 bits are outputted.

The ALU 4 inputs data from the S1 bus 6 and S2 bus 7, and executes operation.

The temporary latch 2 inputs data from the S2 bus 7. The temporary latch 2, as shown by W8 in FIG. 7, inputs the upper three bytes {b1, b2, b3} of the data r2={b1, b2, b3, b4} of 32 bits outputted from the register (2) to the S2 bus 7. At this time, since half word is designated as the writing size, as shown by W9, W10, W11, W12 and W13 in FIG. 7, the control signals C1, C2 and C5 become "1" and the control signals C3 and C4 become "0". As the result, to the D (0:15) 81 in the D bus 8, the data {b1, b2} of upper two bytes among the data of three bytes held in the temporary latch 2 is outputted, and to the D (16:31), that is, to the D (16;23) 82 and the D (24:31) 83, the lower two bytes of the operation result by the ALU 4 are outputted. Accordingly, as shown by W7 in FIG. 7, the data of 32 bits on the D bus 8 becomes to be {b1, b2, c3, c4} .

At the rising of the ø2 shown by W2 in FIG. 7, since register file 1 inputs data of the D bus 8 and writes it intact therein, after finishing of the instruction, the data of the register (2) becomes to be r2={b1, b2, c3, c4} and the fact means that only the lower two bytes are rewritten.

Here, {c3, c4}={a3, a4}+{b3, b4}

Figure 8:
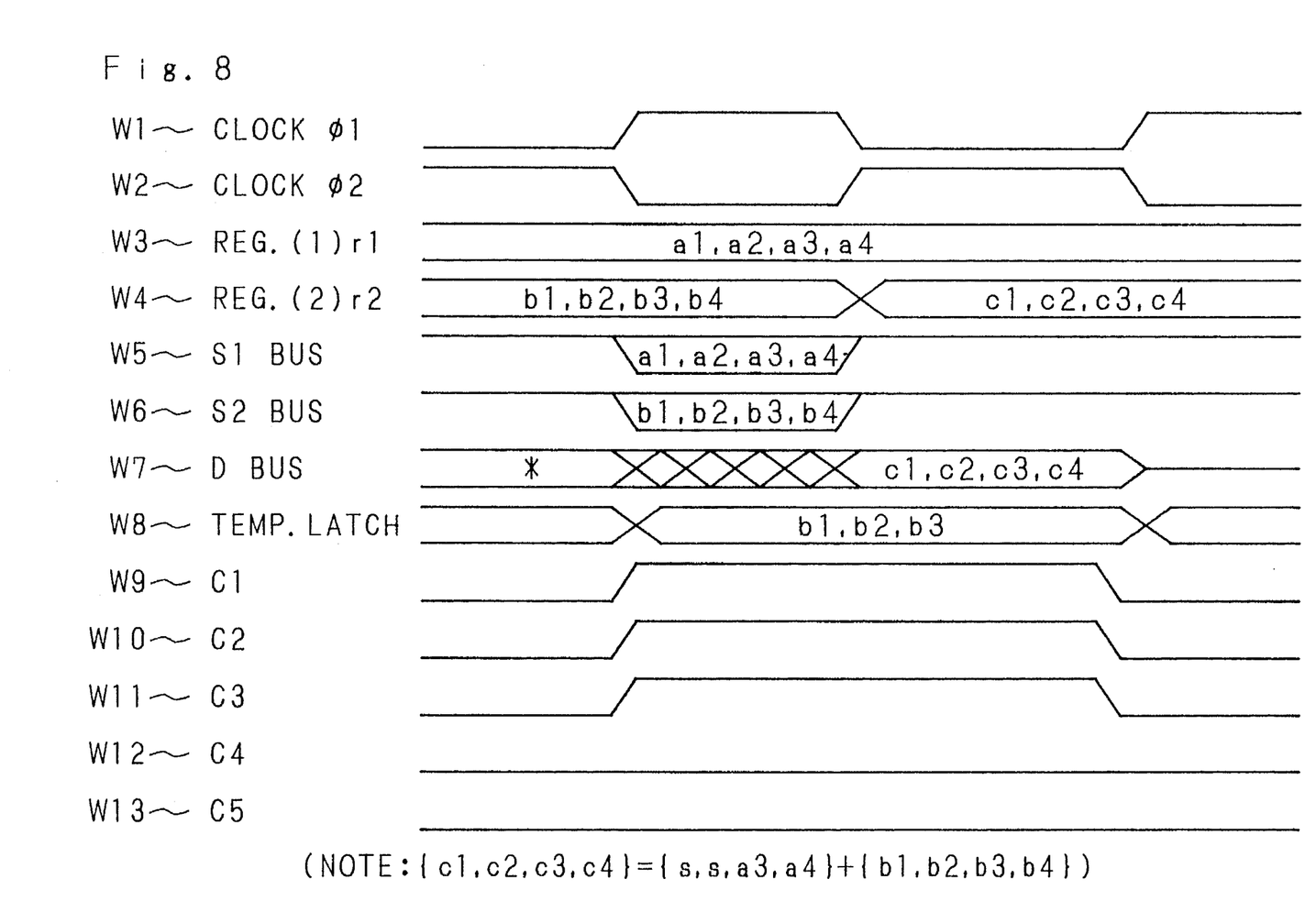
FIG. 8 is a timing chart for explaining of an operation state of a data processing circuit of the invention.

In the timing chart in FIG. 8, a state of a case where processings for "r1. half word+r2. word→r2. word", that is, processings for "half word data of the register (1)+word data of the register (2) are written in the register (2) by word size" are executed, is shown.

At the rising of the clock ø1 shown by W1 in FIG. 8, as shown by W5 and W6 in FIG. 8, the data r1={a1, a2, a3, a4} of the register (1) is outputted to the S1 bus 6, and the data r2={b1, b2, b3, b4} of the register (2) is outputted to the S2 bus 7. In this case, from each of the register (1) and (2), all of the 32 bits are outputted. The ALU 4 inputs data from the S1 bus 6 and the S2 bus 7 and executes operation. At this time, half word is designated as the data size of the S1 bus 6, the lower 16 bits are inputted intact and the upper 16 bits ape signed/zero extended (sign extension or zero extension is executed according the instruction) to be inputted as data of 32 bits, so as to align the data in word size.

The temporary latch 2 inputs data from the S2 bus 7. The temporary latch 2, as shown by W8 in FIG. 8, inputs the upper three bytes {b1, b2, b3} among the data r2={b1, b2, b3, b4} of 32 bits outputted from the register (2) to the S2 bus 7. At this time, since half word is designated as the writing size, as shown by W9, W10, W11, W12 and W13 in FIG. 8, the control signals C1, C2 and C3 become "1" and the control signals C4 and C5 become "0". As the result, four bytes of the ALU 4 are outputted to the D (0:31) of all bits of the D bus 8, and the D bus 8 becomes to be {c1, c2, c3, c4}.

At the rising of ø2 shown by W2 in FIG. 8, the register file 1 inputs the data of the D bus 8 and writes it intact therein. Accordingly, after finishing of the instruction, the data of the register (2) becomes to be r2={c1, c2, c3, c4} , and the fact means that all of the four bytes are rewritten.

Here, {c1, c2, c3, c4}={s, s, a3, a4}+{b1, b2, b3, b4}. In addition, s is the data which sign of {a3, a4} or zero is extended to 8 bits. [In case of three operand instruction]

A three operand instruction takes a form of "source 1 op source 2→destination".
This means that "source 1 data and source 2 data are operated (op) to be stored in destination".

In this case, the source data is inputted from the S1 bus 6 and the source 2 data is inputted from the S2 bus 7, to the ALU 4. And the operation result is written in the destination register.

Here, since both of the S1 bus 6 and the S2 bus 7 are used, it is necessary to provide another route 9 to transfer the value of the destination register to the temporary latch 2. For this purpose, as shown in the block diagram of FIG. 9, one output port is added to the register file 1, and a bus 9 connecting the respective registers 11 of the register file 1 with the temporary latch 2 is provided. In addition, between output port of each register 11 and the bus 9, a tri-state driver 111 which is controlled to output data to the bus 9 or not by the control signal C6 is interposed respectively.

Figure 9:
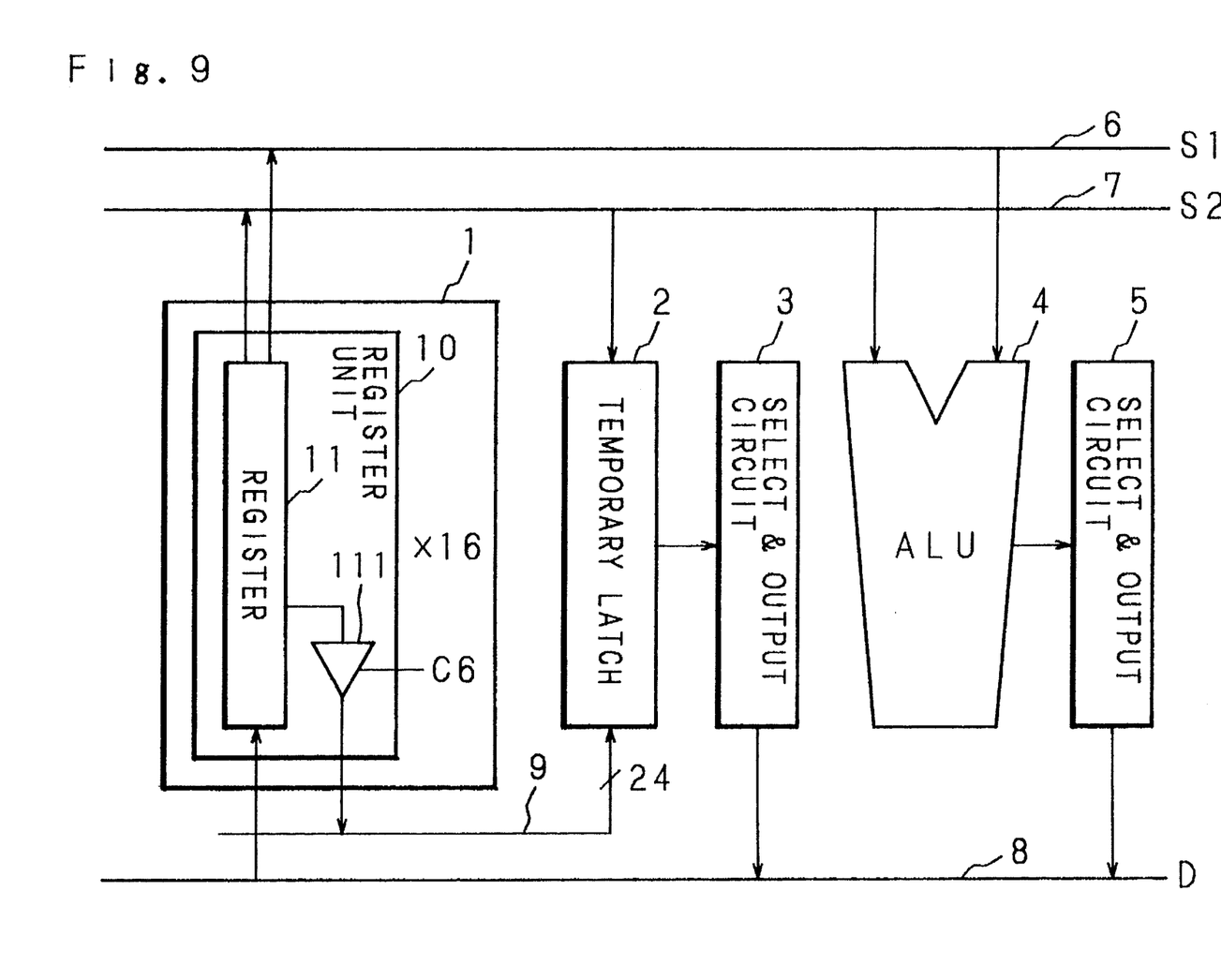
FIG. 9 is a block diagram showing another embodiment of a data processing circuit of the invention.

The operation at the time when the operation result of the ALU 4 and the data held by the temporary latch 2 are outputted to the D bus 8 and written into the register is same as the case of the aforementioned two operand instruction.

As for an arithmetics and logic unit, which writes only a portion designated by the writing size of the operation result, other than the ALU, a select and output circuit being same as the aforementioned select and output circuit 5 for the ALU 4 is required.

Figure 10:
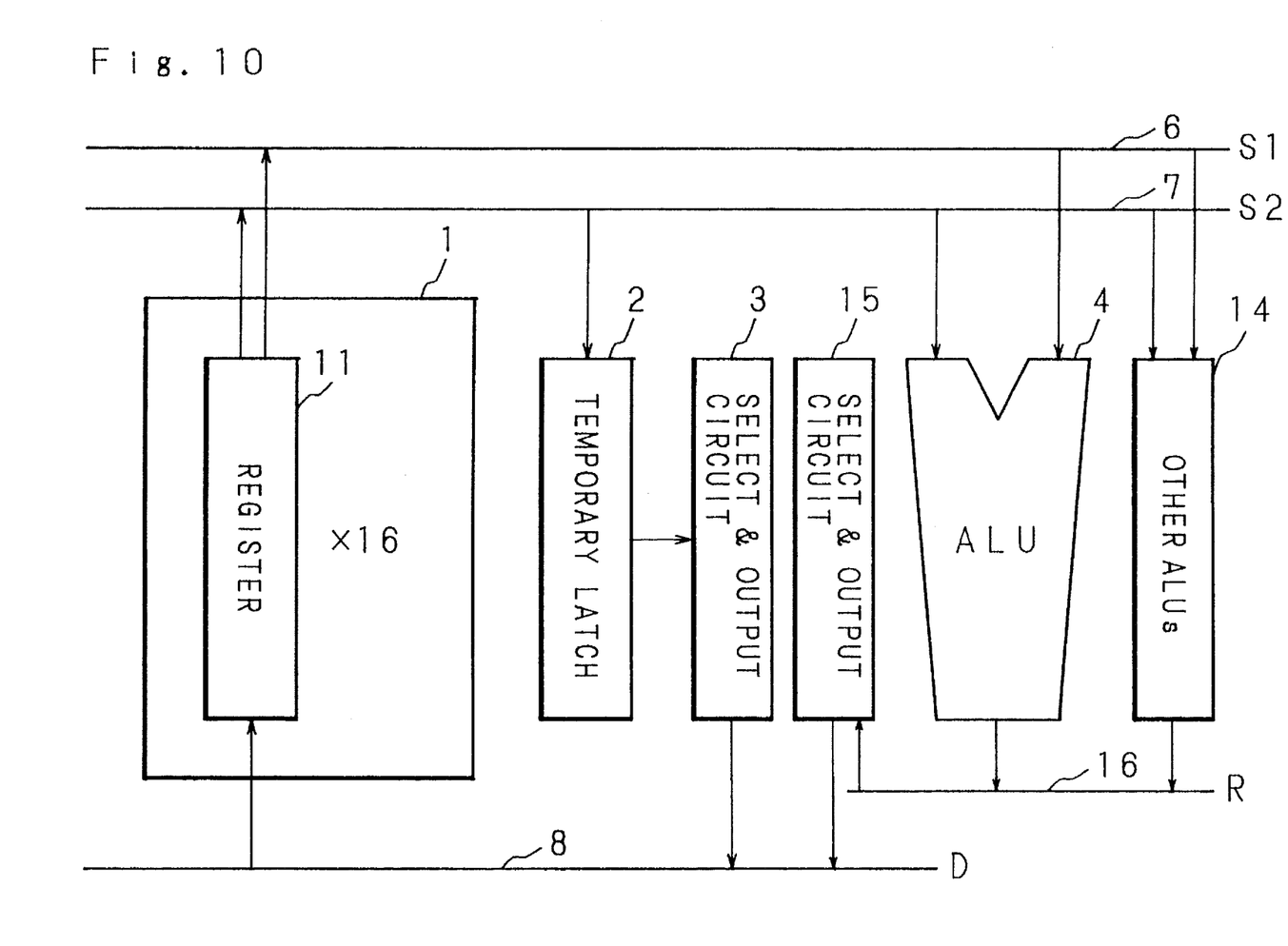
FIG. 10 is a block diagram showing further another embodiment of a data processing circuit of the invention.

It is also possible to form so that a bus outputting a result by an ALU and a bus transferring data written in a register are separated as respectively independent buses shown in a diagram of FIG. 10. In FIG. 10, reference numeral 16 designates an R bus having 32-bit width to which operation result by the ALU 4 is outputted, 14 designates other ALUs, and 15 designates a select and output circuit.

The select and output circuit 15 inputs 32-bit data from the R bus 16, and outputs lower 8 bits, 16 bits, and 32 bits to the D bus 8 according to the data writing size to the register 11.

In the case shown in FIG. 10, from the R bus 16 to which the operation result by the ALU 4 is outputted, only a portion designated by a Writing size is to be transferred to the D bus 8 for register writing by the select and output circuit 15. And at the same time, from the temporary latch 2, a portion other than a portion designated by the writing size is outputted to the D bus 8 for register writing. Into the register 11, data of 32 bits is written from the D bus 8 for register writing.

By adopting such a configuration as aforementioned, to the data processing circuit of the invention, a select and output circuit for the temporary latch 2 and that for the operation unit are new added when compared with the conventional circuit. But on the other hand, as for the respective registers, control lines and select and input circuits are reduced. Usually, since there are many number of registers, in the data processing circuit of the inventions, the area to be reduced in larger than the area to be added on a chip when compared with the conventional circuit, and as a whole, the area to be occupied on a chip is reduced. And when there are a plurality of input ports for a register, the area to be occupied is to be further reduced.

As aforementioned, according to the present invention, it is possible to reduce the area to be occupied on a chip of a register file, and it is also possible to make the whole chip small and to operate at high speed.

As this invention may be embodied in several forms without departing from the spirit of essential characteristics thereof, the present embodiment is therefore illustrative and not restrictive, since the scope of the invention is defined by the appended claims, and all changes that fall within meets and bound is of the claims, or equivalence of such meets and bounds thereof are therefore intended to be embraced by the claims.

What is claimed is:

1. A data processing circuit, comprising:
   a register file (1) including a plurality of registers (11) each of which holds data of n bits;
   an arithmetic and logic unit (4) receiving data through at least a first bus (7) from one register (11) designated in said register file (1);
   a latch (2) coupled to said first bus for inputting and holding at least a part of data of n bits from said designated register (11) to bypass said arithmetic and logic unit;
   a first select and output circuit (5) connected to said arithmetic and logic unit (4) and outputting to a second bus (8) a first plurality of bits of an operation result of said arithmetic and logic unit (4) corresponding to a first portion of m bits which is designated to be a writing size of said second bus (8); and
   a second select and output circuit (3) connected to said latch (2) and outputting to said second bus a second plurality of bits of data held in said latch (2) corresponding to a second portion other than the first portion of said m bits;
   a number of bits in said first and second plurality of bits being variable and controlled by control signals supplied to said first and second select and output circuits;
   whereby the designated register inputs data of n bits from said second bus (8).

2. A data processing circuit as set forth in claim 1, wherein a sum of bit numbers between a part of said bus (6) outputted from said first select and output circuit (5) and a part of said second bus (8) outputted from said second select and output circuit (3) is n bits.

3. A data processing circuit as set forth in claim 1, wherein n is 32 and m is 8.

4. A data processing circuit as set forth in claim 1, wherein n is 32 and m is 16.

5. A data processing circuit as set forth in claim 1, wherein n is 32 and m is 32.

6. A data processing circuit, comprising:
   a register file (1) including a plurality of registers (11) each of which holds data of n bits;
   a latch (2) inputting and holding at least a part of data of n bits from one register designated in said register file (1) through a first bus (7);
   a first select and output circuit (5) connected to an arithmetic and logic unit (4) and outputting to a second bus (8) m bits which has been designated as a writing size in an operation result of said arithmetic and logic unit (4), said arithmetic and logic unit being coupled to said first bus to receive the data from said register file; and a second select and output circuit (3) connected to said latch (2) and outputting a number of bits different, from m to said second bus (8) to bypass said arithmetic and logic unit;

said number of bits being variable and controlled by a control signal supplied to said second select and output circuit;

whereby the register to which data writing has been designated among said plurality of registers (11) inputs data of n bits from said second bus (8).

7. A data processing circuit as set forth in claim 6, wherein a sum of bit numbers between a part of said bus (6) outputted from said first select and output circuit (5) and a part of said second bus (8) outputted from said second select and output circuit (3) is n bits.

8. A data processing circuit as set forth in claim 6, wherein n is 32 and m is 8.

9. A data processing circuit as set forth in claim 6, wherein n is 32 and m 16.

10. A data processing circuit as set forth in claim 6, wherein n is 32 and m is 32.

* * * * *